A. DOAN.
AIR BRAKE.
APPLICATION FILED JAN. 18, 1913.
1,097,305.
Patented May 19, 1914.
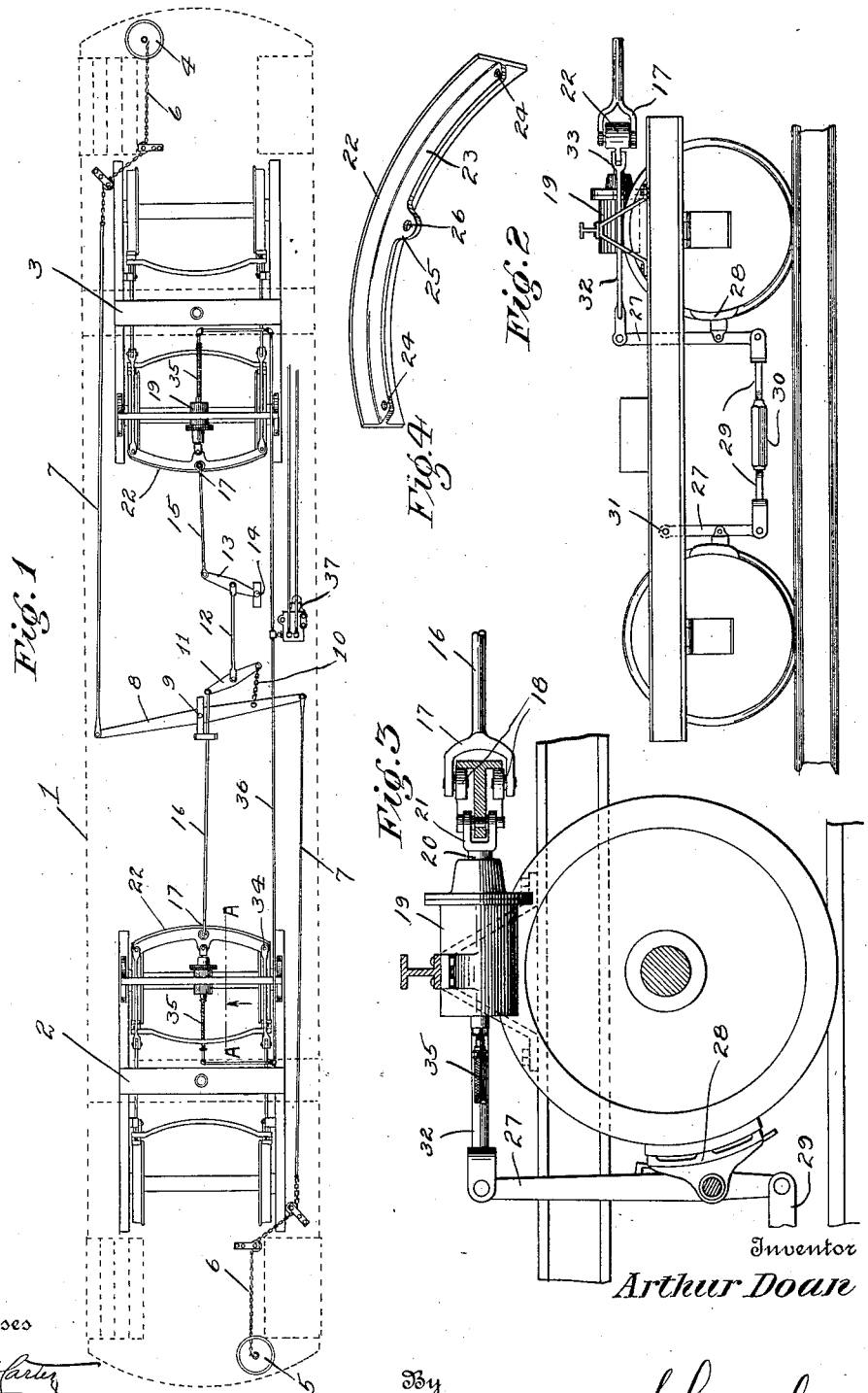
Witnesses
Frank H. Carter
L. A. Stock
Inventor
Arthur Doan
By Harry C. Schroeder
Attorney

UNITED STATES PATENT OFFICE.

ARTHUR DOAN, OF OAKLAND, CALIFORNIA.

AIR-BRAKE.

1,097,305.      Specification of Letters Patent.      Patented May 19, 1914.

Application filed January 18, 1913. Serial No. 742,923.

*To all whom it may concern:*

Be it known that I, ARTHUR DOAN, a citizen of the United States, residing at Oakland, in the county of Alameda and State of California, have invented certain new and useful Improvements in Air-Brakes, of which the following is a specification.

This invention relates to brake operating mechanisms and has special reference to a device by means of which the brakes may be simultaneously set by operating means carried at each end of the car independent of the other end.

Another object of this invention is the production of a braking mechanism by means of which the brakes will be applied evenly upon each wheel.

A still further object of the invention is the production of a truck member which is connected to the manually operable means, and also to the automatic brake means and which is so formed as to allow the truck to turn upon a bend without bringing undue strain to bear upon the braking member.

With these and other objects in view, this invention consists of certain novel combinations, constructions and arrangement of parts, as will be hereinafter fully described and claimed.

In the accompanying drawings: Figure 1, is a view in plan of the brake operating mechanism showing car in dotted lines. Fig. 2, is a side elevation of a portion of the operating mechanism. Fig. 3, is a section taken on the line A—A Fig. 1. Fig. 4, is a perspective view of the improved truck member.

Referring to the accompanying drawings by numerals it will be seen that the device is used in combination with the ordinary car 1, which is provided with the usual truck members 2 and 3. The car is also provided at each end thereof, with the usual hand brakes 4 and 5, which are connected with the chains 6. These chains 6 are connected to the brake rods 7 which are pivotally secured to the brake lever 8. The brake lever 8 is pivotally secured, as at 9, to the bottom portion of the car and intermediate the central portion of this brake lever 8 and one end portion, there is provided a brake chain 10 which is secured to the primary lever 11. This primary lever 11 is provided at its central portion with a pivotally mounted tie link 12, which in turn is pivotally connected to the central portion of the auxiliary lever 13. This auxiliary lever 13 is pivotally mounted to the bottom of the car as at 14, the opposite end of the lever 14 being pivotally connected to the secondary truck rod 15. The primary lever 11 is pivotally secured at one end to the truck rod 16. The truck rods 15 and 16 are each provided with a forked end 17 which carry rollers 18.

Each truck is provided with a cylinder 19 in which the usual stem 20 is slidably mounted. The outer end of this stem 20 is provided with the U-shape portion 21 which in turn is connected to the truck member. This truck member is substantially T-shaped in cross section and bowed longitudinally and comprising a body 22 which carries the integrally formed rib 23. This rib 23 is provided at each end with the aperture 24 and with the centrally located finger 25, which in turn is provided with the aperture 26. This finger 25 is adapted to be placed within the U-shape portion 21 of the stem 20, while the forked portion 17 of the truck rod 16 is adapted to straddle the body 22 so as to allow the rollers 18 to bear upon the inner face of this body 22, so that the rollers may move back and forth thereon.

Each truck is provided with vertical levers 27 which carry the usual brake shoes 28. These levers 27 are provided with the connecting means 29, which are engaged by the turnbuckle 30 whereby the distance between the brake shoes and the wheels may be regulated. One of the levers 27 is pivotally secured to the truck, as indicated at 31 while the upper end of the other lever is pivotally connected to the link 32. This link 32 is provided with a forked end 33 and is provided with a pivoted means 34 which passes through one of the apertures 24.

The flexible coupling or hose 35 is carried at one end of the cylinder 19 and is connected to the pipe 36 which in turn is connected to the air valve 37. By use of this air valve 37, the pipe 36 and the hose 35, air may be admitted to the cylinder 19 for forcing the stem 20 outwardly and in this manner set the brakes.

In operation when either of the brake rods 7 are moved the brake lever 8 will be so moved as to draw upon the brake chain 10, and in this means swing the primary lever 11 which in turn will draw the truck rod 16 which is attached to the truck member. In this manner since the truck member is connected to the pivotally mounted lever 27 by means of the link 32, the brakes will be set upon the wheels. When this primary lever 11 is swung it will draw upon the pivotally mounted auxiliary lever 13 by means of the tie rod 12. When this auxiliary lever 13 is moved it will draw the secondary truck rod 15 which is connected to the other truck member and will in this manner set the brakes upon the other truck. If it is desired to use the air brakes the valve member 37 may be operated so as to allow the air to pass into the pipe 36 and into the cylinder 19 by means of the flexible pipe 35 whereby the stem 20 will be forced outwardly and will in this manner set the brakes. When the car runs around a bend, the truck, of course, will move to one side and since the truck rods are mounted upon the truck members by means of the rollers, the rollers will move to one side of the central portion of the truck member and will avoid any undue strain thereon.

From the foregoing description, it will be seen that the brakes may be set by either the ordinary hand brake means, or by the air brakes and the levers are so arranged as to cause even pressure upon each wheel when the car is stopped and will in this means cause the same to stop evenly and will also prevent what is known as "flat wheels." The chief advantage however of this construction is secured when the device is applied to motor cars which run singly. In the usual brake rigging the single air cylinder is connected to either lever 8 or 11 hence if either rod 15 or 16 breaks both the hand brakes and air brake on both trucks are rendered inoperative.

Having thus described the invention what is claimed as new, is:

1. In a device of the class described, the combination of the car provided with a plurality of trucks, a plurality of operating levers mounted upon said car, each of said trucks provided with a truck member and means for supporting the same, a plurality of truck rods connected to said operating levers, each of said truck rods provided with a forked end, rollers carried by said forked end, said truck members provided with a body portion, an integrally formed flange carried by said body, said forked end adapted to straddle said body and said rollers adapted to move upon the inner face of said body whereby when the truck moves to one side the rollers may also move so as to prevent undue strain upon the operating mechanism, levers provided with brake shoes and also provided with means attached to each end of said truck member, whereby the brakes may be set, if so desired.

2. In a device of the class described, the combination with the car provided with a plurality of trucks, said car also provided with a primary lever, and an auxiliary lever pivotally secured to said car and means for operating said levers each of said trucks provided with a cylinder, a stem slidably mounted within the said cylinder, a truck member carried by each of said trucks, said truck member comprising a body provided with an integrally formed rib extending at right angles thereto, said rib provided with a centrally arranged finger, said stem connected to said finger for supporting said truck member, brake means carried by each truck and connected to said truck member, said stem adapted to be forced outwardly for setting brakes, a plurality of truck rods attached to said primary and auxiliary levers, each truck rod provided with a forked end, having a plurality of wheels, said forked end of said truck rod adapted to straddle said body of said truck member for allowing said wheels to rest upon the inner face of said body, means for manually operating said truck rod, said truck member being of a bow shape structure whereby when the truck moves from side to side the rollers may move so as to prevent undue strain upon the mechanism, and pipes connected to said cylinder for allowing air to enter said cylinder for forcing said stem outwardly when so desired, whereby the brakes will be set.

In testimony whereof I affix my signature in presence of two witnesses.

ARTHUR DOAN.

Witnesses:
FRANK H. CARTER,
F. P. SCHROEDER.